(12) United States Patent
Kim

(10) Patent No.: US 8,028,664 B2
(45) Date of Patent: Oct. 4, 2011

(54) DEVICE FOR GENERATING THE SUPERHEATED STEAM

(75) Inventor: Hak Kwon Kim, Seoul (KR)

(73) Assignee: Jaeyoung Solutec Co., Ltd., Incheon (KR)

( * ) Notice: Subject to any disclaimer, the term of this patent is extended or adjusted under 35 U.S.C. 154(b) by 568 days.

(21) Appl. No.: 12/086,503

(22) PCT Filed: Dec. 14, 2006

(86) PCT No.: PCT/KR2006/005447
§ 371 (c)(1),
(2), (4) Date: Aug. 15, 2008

(87) PCT Pub. No.: WO2007/069855
PCT Pub. Date: Jun. 21, 2007

(65) Prior Publication Data
US 2009/0126654 A1    May 21, 2009

(30) Foreign Application Priority Data
Dec. 14, 2005    (KR) .................. 10-2005-0123156

(51) Int. Cl.
*F22G 7/04* (2006.01)
(52) U.S. Cl. ........................... 122/481; 122/487
(58) Field of Classification Search ............ 122/481, 122/483, 484, 485, 487, 209.1, 221, 337, 122/338, 339
See application file for complete search history.

(56) References Cited

U.S. PATENT DOCUMENTS
4,312,303 A * 1/1982 Sisk .................... 122/34
(Continued)

FOREIGN PATENT DOCUMENTS
JP    4-198603    7/1992
(Continued)

OTHER PUBLICATIONS
English Language Abstract of JP Publication No. 4-198603, dated Jul. 20, 1992, 1 page.
(Continued)

*Primary Examiner* — Gregory A Wilson
(74) *Attorney, Agent, or Firm* — Haynes and Boone, LLP

(57) ABSTRACT

The present invention relates to a device for generating superheated steam, comprising: a housing (10) having a cylindrical body and a combustion chamber with a hollow space portion formed in the cylindrical body, the housing having a discharge outlet (13) formed at a bottom end thereof so as to allow superheated steam to be discharged to the outside therethrough; a cover (14) mounted on a top end of the housing and having an injection inlet (12) formed at a top end thereof so as to allow steam to be injected into the housing 10 therethrough; a plurality of interval-maintaining means (20) horizontally stackingly arranged on top of one another in the combustion chamber of the housing in such a fashion that interval-maintaining means of even and odd number rows are alternately disposed and equidistantly spaced apart from one another, the interval-maintaining means of even and odd number rows having different outer diameters so as to define a fluid-communicating passageway (25) between the inner wall of the combustion chamber (11) and the interval-maintaining means (20); and a plurality of heating means (30) penetratingly mounted vertically in the plurality of interval-maintaining means (20) in such a fashion as to be arranged spaced apart from one another equidistantly at a peripheral portion of the interval-maintaining means so as to heat fluid passing through the fluid-communicating passageway (25).

2 Claims, 2 Drawing Sheets

U.S. PATENT DOCUMENTS

| | | | | |
|---|---|---|---|---|
| 4,528,946 A | * | 7/1985 | Greis | 122/483 |
| 4,668,344 A | | 5/1987 | Lorenz et al. | |
| 6,393,212 B1 | * | 5/2002 | Hutchinson | 392/491 |
| 6,647,204 B1 | * | 11/2003 | Hutchinson | 392/491 |
| 7,115,845 B2 | * | 10/2006 | Nomura et al. | 219/630 |
| 7,823,543 B2 | * | 11/2010 | Nomura | 122/31.1 |
| 2003/0215226 A1 | * | 11/2003 | Nomura et al. | 392/397 |

FOREIGN PATENT DOCUMENTS

| | | |
|---|---|---|
| JP | 2004-233040 | 8/2004 |
| JP | 2004-301498 | 10/2004 |
| JP | 2005-226928 | 8/2005 |

OTHER PUBLICATIONS

English Language Abstract of JP Publication No. 2004-301498, dated Oct. 28, 2004, 1 page.

English Language Abstract of JP Publication No. 2005-226928, dated Aug. 25, 2005, 1 page.

English Language Abstract of JP Publication No. 2004-233040, dated Aug. 19, 2004, 1 page.

* cited by examiner

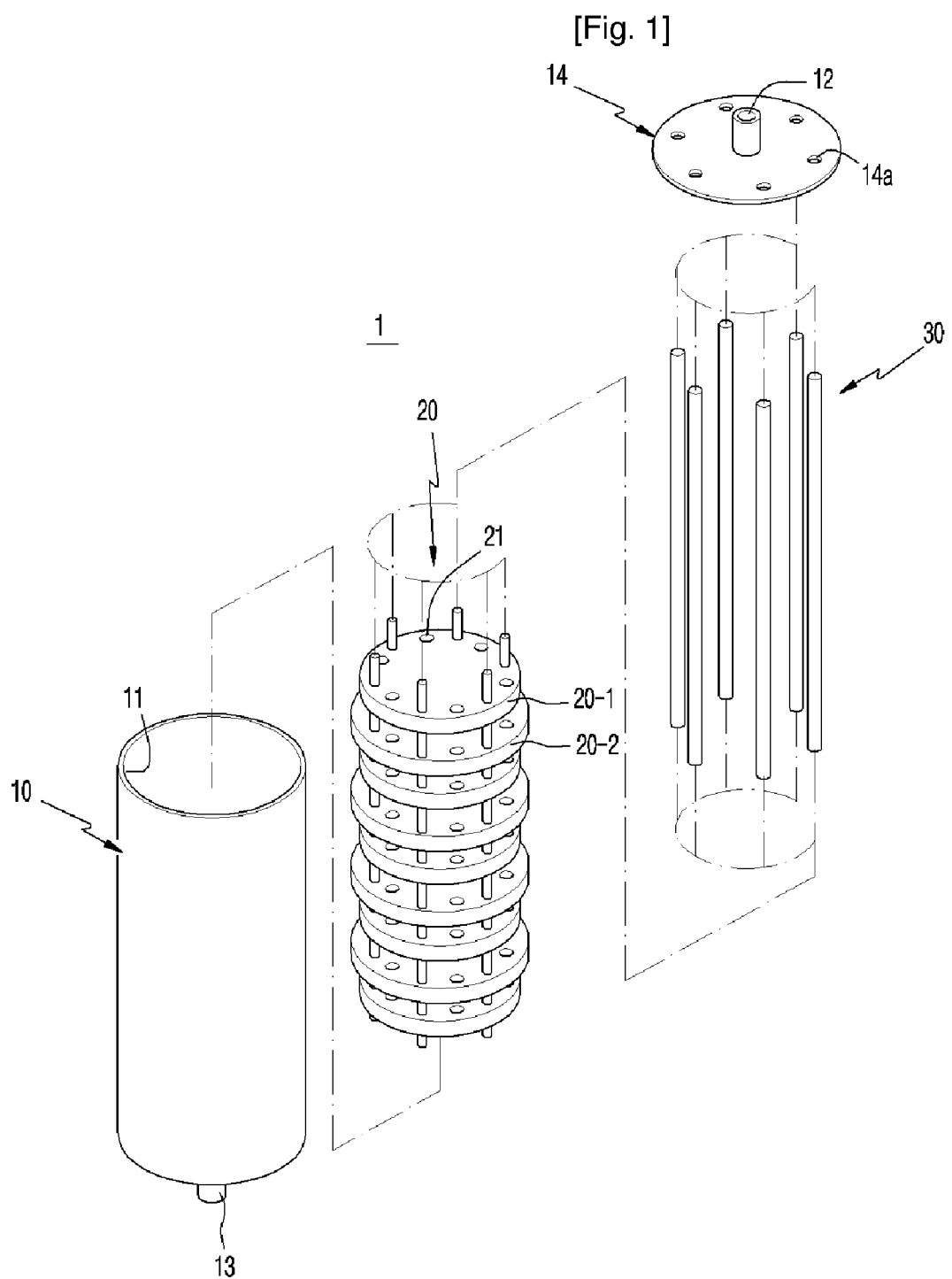

[Fig. 2]
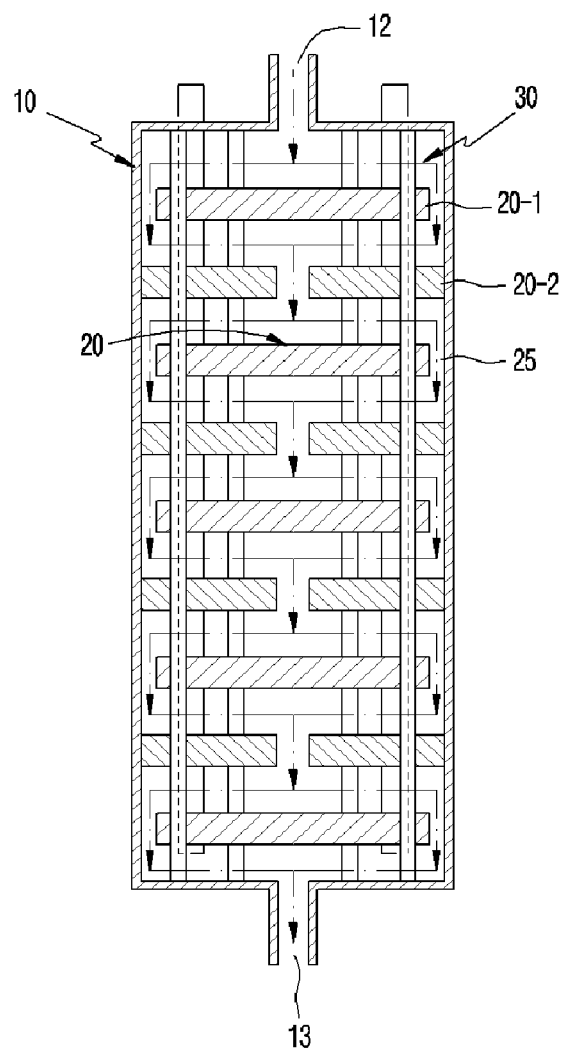
[Fig. 3]
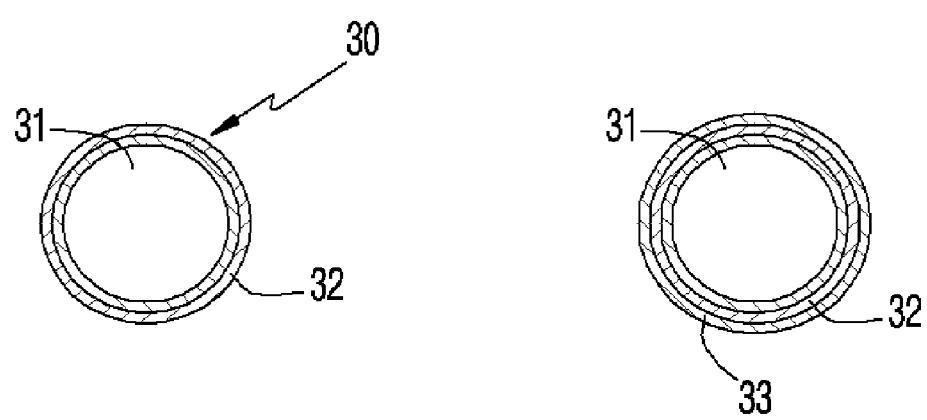

DEVICE FOR GENERATING THE SUPERHEATED STEAM

TECHNICAL FIELD

The present invention relates to a device for generating superheated steam, which heats steam supplied from a steam generator to produce superheated steam, and more particularly, to such a superheated steam-generating device of which inner structure is simplified to enhance convenience according to its maintenance and repair and maximize its operating performance.

BACKGROUND ART

In general, a method of cooking food contained within a cooker is largely divided into a direct-heating type in which the food is directly heated using a heat source such as a gas range, a burner or the like, and an indirect-heating type in which the food is indirectly heated using a heat source such as water vapor or steam. Specifically, an example of the indirect-heating method includes a method in which superheated steam is injected into the cooker to cook the food.

Such a cooking method using the superheated steam features that food is heated uniformly to cause the food to be prevented from being burnt locally and the temperature and supply amount of the superheated steam to be easily adjusted, thereby readily controlling the characteristics of the cooking and preventing the occurrence of oxidization due to steam which causes flavor to be maintained.

Cooking equipment using the superheated steam includes a cooking room, a steam generator for heating water supplied thereto from a water tank to generate steam, a superheated steam generator for heating the steam generated from the steam generator to generate superheated steam, and a steam piping unit for supplying the superheated steam generated from the superheated steam generator to the cooking room.

However, the superheated steam generator entails several problems in that since it should have a plurality of constituent parts including a screw-type heat transfer tubes to secure a fluid-passing cross-section required to generate and treat the superheated steam, the operating structure thereof is complicated and the manufacturing cost increases, which leads to an increase in maintenance and repair costs of products.

In addition, the superheated steam generator has a problem in that it is difficult to obtain superheated steam having a uniform temperature since a deviation of fluid flow rate is large due to a complexity of built-in components. Moreover, if local overheat occurs in the heat transfer tube itself due to the deviation of fluid flow rate, there is caused another problem in that the built-in components are deteriorated to thereby degrade durability of the superheated steam.

DISCLOSURE OF INVENTION

Technical Problem

Accordingly, the present invention has been made to address and solve the above-mentioned problems occurring in the prior art, it is an object of the present invention to provide a device for generating superheated steam, of which inner structure is simplified so as to increase convenience of maintenance and repair and maximize its operating performance.

Technical Solution

To accomplish the above object, according to one aspect of the present invention, there is provided a device for generating superheated steam which includes: a housing having a cylindrical body and a combustion chamber with a hollow space portion formed in the cylindrical body, the housing having a discharge outlet formed at a bottom end thereof so as to allow superheated steam to be discharged to the outside therethrough; a cover mounted on a top end of the housing and having an injection inlet formed at a top end thereof so as to allow steam to be injected into the housing therethrough; a plurality of interval-maintaining means horizontally stackingly arranged on top of one another in the combustion chamber of the housing in such a fashion that interval-maintaining means of even and odd number rows are alternately disposed and equidistantly spaced apart from one another, the interval-maintaining means of even and odd number rows having different outer diameters so as to define a fluid-communicating passageway between the inner wall of the combustion chamber and the interval-maintaining means; and a plurality of heating means penetratingly mounted vertically in the plurality of interval-maintaining means in such a fashion as to be arranged spaced apart from one another equidistantly at a peripheral portion of the interval-maintaining means so as to heat fluid passing through the fluid-communicating passageway.

Advantageous Effects

According to the superheated steam-generating device of the present invention, a plurality of heating elements is fixedly vertically sequentially to the plurality of interval-maintaining means within the housing in such a fashion as to be arranged spaced apart from one another equidistantly at a peripheral portion of the interval-maintaining members so as to generate superheated steam, so that the inner structure of the superheated steam-generating device is simplified to enhance convenience according to its maintenance and repair, reduce the manufacturing cost and maximize its operating performance, thereby maximizing the cooking efficiency.

BRIEF DESCRIPTION OF THE DRAWINGS

FIG. 1 is an exploded perspective view illustrating a device for generating supreheated steam according to the present invention in a disassembled state;

FIG. 2 is a cross-sectional view illustrating a device for generating superheated steam according to the present invention in an assembled state; and FIGS. 3(a) and 3(b) are cross-sectional views illustrating heating means of a device for generating superheated steam according to the present invention.

BEST MODE FOR CARRYING OUT THE INVENTION

Reference will now be made in detail to the preferred embodiment of the present invention with reference to the attached drawings.

FIGS. 1 and 2 are exploded perspective views illustrating a device for generating superheated steam according to the present invention in disassembled and assembled states, respectively, and FIGS. 3(a) and 3(b) are cross-sectional views illustrating heating means of a device for generating superheated steam according to the present invention.

The device for generating superheated steam according to the present invention includes a housing 10, a cover 14, a plurality of disc-like interval-maintaining members 20, and a plurality of heating elements 30.

The housing 10 has a cylindrical body and a combustion chamber 11 with a hollow space portion formed in the cylindrical body. The housing 10 also has an injection inlet 12 formed in at a top end thereof and a discharge outlet 13 formed at a bottom end thereof. The plurality of disc-like interval-maintaining members 20 is horizontally stackingly arranged on top of one another in the combustion chamber 11 of the housing 10 in such a fashion that interval-maintaining members of even and odd number rows are alternately disposed and spaced apart from one another by equal distances. In this case, the interval-maintaining members 20 of even and odd number rows have different from each other in outer diameters so as to define a fluid-communicating passageway 25 in the combustion chamber between the inner wall of the cylindrical housing 10 and the interval-maintaining members 20.

The plurality of heating elements 30 is penetratingly mounted vertically in the plurality of interval-maintaining members 20 in such a fashion as to be arranged spaced apart from one another at equal distances at a peripheral portion of the interval-maintaining members so as to heat fluid passing through the fluid-communicating passageway 25.

First, in the cooking equipment, since a cooking room serving to accommodate food, a steam generator for generating steam or a steam piping through which superheated steam is injected, etc., is well known, its detailed description will be omitted. The present invention features that the housing 10, the plural interval-maintaining members 20 and the plural heating elements 30 are mutually engaged with one another to constitute the device for generating superheated steam.

The housing 10 takes a cylindrical shape to define the outer appearance of the device for generating superheated steam according to the present invention, and is formed internally with a combustion chamber 11 having a predetermined sized-hollow space along the longitudinal direction thereof. The cover 14 is mounted on the housing 10. The cover 14 has an injection inlet 12 formed in at a top end thereof so as to allow steam to be injected into the housing 10 therethrough. The housing 10 has a discharge outlet 13 formed at a bottom end thereof so as to allow superheated steam to be discharged to the outside therethrough.

Also, the cover 14 is preferably securely fixed to the top end portion of the housing by means of a fastening means such as a bolt or in a press-fitting manner. Specifically, the cover 14 has a plurality of through-holes 14a formed thereon for allowing the plurality of heating elements 30 to be protruded upwardly therethrough, which will be described later.

Further, the housing 10 is preferably formed in a cylindrical or polygonal shape in terms of its outer appearance and is preferably made of a material excellent in corrosion resistance and heat resistance such as stainless steel, etc.

The interval-maintaining members 20 serves to partition the combustion chamber 11 defined inside the housing 10 into various spatial parts, and are preferably stackingly arranged sequentially spaced apart from one another by predetermined distances. Particularly, the interval-maintaining members 20 serve to support the heating elements 30.

The interval-maintaining members 20 of even and odd number rows 20-1 and 20-2 have different from each other in outer diameters so that a fluid-communicating passageway 25 is defined between the inner wall of the combustion chamber 11 and the interval-maintaining members 20-1 of odd number rows.

In addition, each of the interval-maintaining members 20 has a plurality of fitting holes 21 formed therein in such a fashion as to be arranged spaced apart from one another equidistantly at a peripheral portion of the interval-maintaining members so as to fixedly fit the heating elements 30 thereto.

Also, the interval-maintaining member 20 can preferably be made of a material excellent in corrosion resistance and heat resistance such as stainless steel, etc., but it is natural that the interval-maintaining member 20 may be made of a heat-insulating material such as a refractory brick, etc.

The heating elements 30 are securely fit into the fitting holes 21 of the interval-maintaining members 20 by means of welding or press-fitting so as to heat fluid passing through the fluid-communicating passageway 25.

The heating elements 30 includes a hot wire 31 disposed at the central portion thereof. A ceramic member 32 or stainless steel 33 is coated on the hot wire 31, or the ceramic member 32 and stainless steel 33 are sequentially coated on the hot wire 31.

Now, the operation of the device for generating superheated steam according to the present invention will be described hereinafter.

First, in constructing the superheated steam-generating device 1 of the present invention, the heating elements 30 are fixedly fit into the fitting holes 21 of the interval-maintaining members 20, and then an assembly of the interval-maintaining members 20 and the heating elements 30 is mounted in the combustion chamber 11 of the housing 10.

Then, when the cover 14 is mounted on the top end of the housing 10 and hermetically fixed thereto, the setting work of the superheated steam-generating device of the present invention is completed.

In a state where the plurality of interval-maintaining members 20 are horizontally arranged stackingly on top of one another in the combustion chamber 11 of the housing 10 in such a fashion as to be spaced apart from one another by equal distances, the plurality of heating elements 30 are set vertically in the plurality of interval-maintaining members 20 in such a fashion as to be arranged spaced apart from one another equidistantly at a peripheral portion of the interval-maintaining means.

Subsequently, when electric power is supplied to the superheated steam-generating device 1, the combustion chamber 11 is heated to a set temperature while the heating elements 30 are operated, so that steam to be heated is supplied into the combustion chamber 11 through the injection inlet 12 of the cover 14 and is pressurized to a set pressure.

Resultantly, the steam supplied to the combustion chamber 11 is gradually heated to the set temperature while passing through a gap, i.e., a fluid-communicating passageway 25 defined between the inner wall of the combustion chamber 11 and the interval-maintaining members 20-1 of odd number row and the interval-maintaining members 20-2 of even number row, and then is discharged to the outside through the discharge outlet 13.

In the meantime, in case where the superheated steam-generating device 1 needs to be repaired due to its damage, when the cover 14 is opened and then the interval-maintaining members 20 or the heating elements 30 are replaced and repaired, a series of maintenance and repair works are completed.

INDUSTRIAL APPLICABILITY

As described above, according to the superheated steam-generating device of the present invention, a plurality of heating elements is fixedly vertically sequentially to the plurality of interval-maintaining means within the housing in such a fashion as to be arranged spaced apart from one another equidistantly at a peripheral portion of the interval-maintaining members so as to generate superheated steam, so that the inner structure of the superheated steam-generating device is simplified to enhance convenience according to its maintenance and repair, reduce the manufacturing cost and maximize its operating performance, thereby maximizing the cooking efficiency.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A device for generating superheated steam which comprises:

a housing 10 having a cylindrical body and a combustion chamber with a hollow space portion formed in the cylindrical body, the housing having a discharge outlet 13 formed at a bottom end thereof so as to allow superheated steam to be discharged to the outside therethrough;

a cover 14 mounted on a top end of the housing and having an injection inlet 12 formed at a top end thereof so as to allow steam to be injected into the housing 10 therethrough;

a plurality of interval-maintaining means 20 horizontally stackingly arranged on top of one another in the combustion chamber of the housing in such a fashion that interval-maintaining means of even and odd number rows are alternately disposed and equidistantly spaced apart from one another, the interval-maintaining means of even and odd number rows having different outer diameters so as to define a fluid-communicating passageway 25 between the inner wall of the combustion chamber 11 and the interval-maintaining means 20; and a plurality of heating means 30 penetratingly mounted vertically in the plurality of interval-maintaining means 20 in such a fashion as to be arranged spaced apart from one another equidistantly at a peripheral portion of the interval-maintaining means so as to heat fluid passing through the fluid-communicating passageway 25.

2. The device according to claim 1, wherein the heating means 30 includes a hot wire 31 disposed at the central portion thereof, and a ceramic member 32 or stainless steel 33 coated on the hot wire 31, or the ceramic member 32 and stainless steel 33 sequentially coated on the hot wire 31.

* * * * *